(12) United States Patent  
Strickland et al.

(10) Patent No.: US 7,254,016 B1
(45) Date of Patent: Aug. 7, 2007

(54) DATA STORAGE SYSTEM WITH IMPROVED SERVICEABILITY FEATURES

(75) Inventors: Stephen E. Strickland, Marlboro, MA (US); Adrianna D. Bailey, Upton, MA (US); Steven D. Sardella, Marlborough, MA (US); Alan McIlvene, Shrewsbury, MA (US); Maida Boudreau, Brimfield, MA (US)

(73) Assignee: EMC Corporation, Hopkinton, MA (US)

( * ) Notice: Subject to any disclaimer, the term of this patent is extended or adjusted under 35 U.S.C. 154(b) by 284 days.

(21) Appl. No.: 10/853,746

(22) Filed: May 25, 2004

(51) Int. Cl.
*H05K 5/00* (2006.01)
*H05K 7/00* (2006.01)

(52) U.S. Cl. .................. 361/684; 439/61; 361/788; 361/724

(58) Field of Classification Search ........... 361/685, 361/684, 788, 724
See application file for complete search history.

(56) References Cited

U.S. PATENT DOCUMENTS

| | | | |
|---|---|---|---|
| 5,877,938 A * | 3/1999 | Hobbs et al. | 361/724 |
| 6,324,062 B1 * | 11/2001 | Treiber et al. | 361/727 |
| 6,370,657 B1 * | 4/2002 | Jansen et al. | 714/23 |
| 6,678,788 B1 | 1/2004 | O'Connell | 711/114 |
| 6,691,209 B1 | 2/2004 | O'Connell | 711/114 |
| 6,718,481 B1 | 4/2004 | Fair | 714/4 |
| 6,742,068 B2 * | 5/2004 | Gallagher et al. | 710/302 |
| 6,751,094 B2 * | 6/2004 | Kolb et al. | 361/687 |
| 6,865,157 B1 | 3/2005 | Scott et al. | 370/242 |
| 6,906,914 B2 * | 6/2005 | Stamos et al. | 361/683 |
| 6,950,895 B2 * | 9/2005 | Bottom | 710/301 |
| 6,985,357 B2 * | 1/2006 | Cauthron | 361/683 |
| 7,012,815 B2 * | 3/2006 | Garnett et al. | 361/825 |
| 2003/0048615 A1 * | 3/2003 | King et al. | 361/724 |

\* cited by examiner

*Primary Examiner*—Lisa Lea-Edmonds
*Assistant Examiner*—Ingrid Wright
(74) *Attorney, Agent, or Firm*—BainwoodHuang (57) ABSTRACT

A data storage system having an interconnect, storage devices coupled to a first side of the interconnect, and a processing subsystem coupled to a second side of the interconnect that is substantially opposite the first side. The method involves a user (e.g., a customer) receiving a fault signal from the data storage system (e.g., an email notification, a GUI message, an LED pattern, etc.), identifying a component of the data storage system as faulty in response to receiving the fault signal, and replacing the identified component with a new component. In general, the user replaces the identified component in a hot-swapping manner when the identified component is a storage device or a power supply. Additionally, the user replaces the identified component in a powered-down manner when the identified component is a portion of a storage processing circuit (e.g., an internal fan, a memory circuit, a storage processing circuit, etc.).

19 Claims, 5 Drawing Sheets

DATA STORAGE SYSTEM WITH IMPROVED SERVICEABILITY FEATURES

BACKGROUND OF THE INVENTION

A data storage system stores and retrieves information on behalf of one or more external host computers. A typical data storage system includes power supply circuitry, a storage processor, and a set of disk drives. The power supply circuitry provides power to the storage processor thus enabling the storage processor to load data into and retrieve data from the set of disk drives on behalf of the external host computers.

There are a variety of approaches to obtaining and servicing a data storage system. For example, a company which is in need of a reliable data storage system with a relatively large operating budget typically purchases a data storage system configured for high availability (e.g., redundant components) and a field service contract for servicing the data storage system. Under the field service contract, a trained field service technician typically visits the data storage system at the customer site to address any problems encountered with the data storage system. For instance, if a disk drive fails, the technician typically travels to the customer site to manually replace the failed disk drive. The data storage system is often configured to allow hot-swapping of the failed disk drive so that the data storage system as a whole remains operational (i.e., "available") during the disk drive replacement operation.

A company which is in need of a data storage system but which is not fortunate enough to have a relatively large data storage system budget typically purchases a more modest data storage system sacrificing high availability. That is, the company makes a conscious decision not to purchase a data storage system with certain high availability features and not to purchase a field service contract in order to lower operating costs. Here, the company accepts the risk that a failure in certain components of the more modest data storage system may require the customer to lose access to the data storage system for a period of time. For example, if a disk drive fails, the customer may send the data storage system out for servicing, or alternatively call for a technician to make a special one-time visit to the customer site to replace the failed disk drive but at a premium cost or with a relatively long delay since the technician is not under a field service contract.

SUMMARY OF THE INVENTION

Unfortunately, there are deficiencies to the above-described conventional approaches to obtaining and servicing a data storage system. For example, it is typically very expensive for companies to carry out the above-described approach which involves these companies obtaining data storage systems with high availability and field service contracts. Although such an approach works for very large institution-sized companies in which it would be extremely detrimental or even catastrophic to lose system availability (e.g., banks, financial market and investment companies, military, etc.), such approaches are often too expensive and impractical for smaller establishments that could nevertheless benefit from high availability.

Additionally, it is typically counterproductive for companies to carry out the above-described approach which involves these companies making conscious decisions not to purchase data storage systems with high availability features and not to purchase field service contracts in order to lower operating costs. In particular, any extended downtime (e.g., due to having to send the data storage systems out for repair, due to waiting for non-contracted repair-people to show up and make repairs, etc.) exposes these companies to drawbacks (e.g., lost business, lost goodwill, loss of reputation for quality, etc.). Nevertheless, most lower-end data storage systems are not serviceable by anyone except extremely well-trained professional technicians. Such technicians are typically experienced and well-equipped (e.g., possess the proper tools) to service the data storage systems efficiently and effectively. On the other hand, customers are typically unqualified (i.e., without the "know-how") and/or unprepared (i.e., without the proper tools) to service their own data storage systems in any capacity, and would run the risk of damaging such systems or hurting themselves if they tried.

In contrast to the above-described conventional approaches to obtaining and servicing data storage systems, embodiments of the invention are directed to techniques for servicing a data storage system which are simple and easy to perform even by an untrained person (e.g., a common or average user of the data storage system). Such techniques rely on smart partitioning of various data storage system components (e.g., storage devices, power supplies, storage processing circuits) which enables the data storage system to provide high availability features but nevertheless be affordable and serviceable by the untrained person thus allowing for timely and effective customer self-servicing and alleviating the need for an expensive field service contract.

One embodiment is directed to a method for servicing a data storage system having an interconnect, storage devices coupled to a first side of the interconnect, and a processing subsystem coupled to a second side of the interconnect that is substantially opposite the first side. The method involves a user (e.g., a customer) receiving a fault signal from the data storage system (e.g., an email notification, a GUI message, an LED pattern, etc.), identifying a component of the data storage system as faulty in response to receiving the fault signal, and replacing the identified component with a new component. In general, the user replaces the identified component in a hot-swapping manner when the identified component is a storage device or a power supply. Additionally, the user replaces the identified component in a powered-down manner when the identified component is a portion of a storage processing circuit (e.g., a failed internal fan, a bad memory circuit, a bad storage processing circuit, etc.). Such replacements are capable of being performed in relatively short amounts of time in a straight forward manner and without tools for enhanced user-friendliness.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for servicing a data storage system which are generally simple and easy to perform even by an untrained person (e.g., a novice). Such techniques rely on smart partitioning of various data storage system components (e.g., storage devices, power supplies, storage processing circuits) which enables the data storage system to provide high availability features but nevertheless be affordable and serviceable by the untrained person thus allowing for timely and effective self-servicing and alleviating the need for an expensive field service contract.

Figure 1:
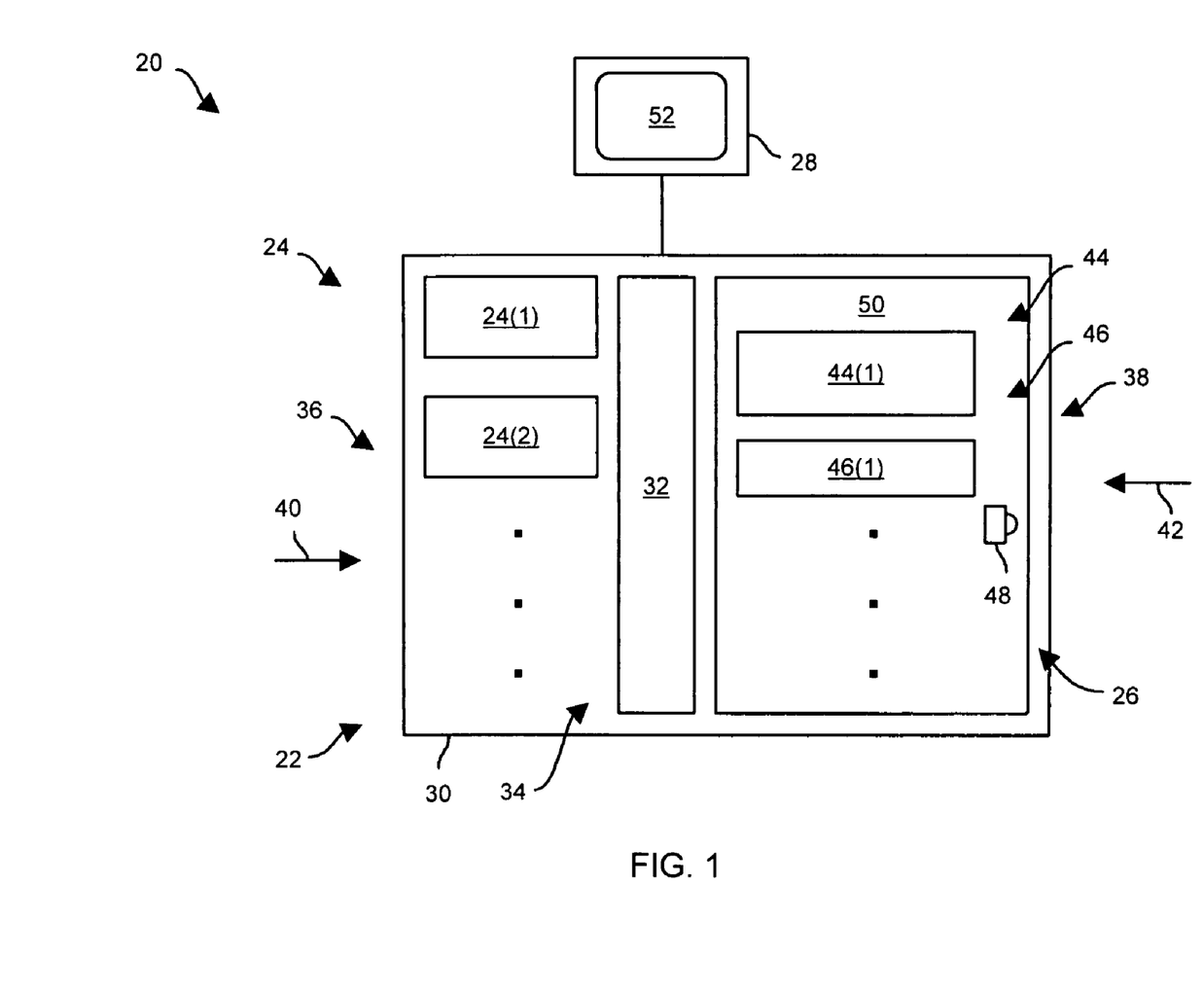
FIG. 1 shows a block diagram of a data storage system which is suitable for use by the invention.

FIG. 1 shows a data storage system 20 which is suitable for use by the invention. The data storage system 20 includes a base 22, a set of storage devices 24(1), 24(2), . . . (collectively, storage devices 24), a processor subsystem 26, and an input/output device 28. The set of storage devices 24 includes at least one storage device 24 such as a magnetic disk drive. In some arrangements, the set of storage devices 24 includes an array of disk drives which operates in accordance with standard data storage schemes (e.g., logical volumes, virtual disks, RAID, other striping and load balancing schemes, etc.).

As shown in FIG. 1, the base 22 includes a frame 30 and an interconnect 32 disposed within an inner location 34 defined by the frame 30. The frame 30 further defines a front opening 36 for receiving the storage devices 24 and a back opening 38 for receiving the processor subsystem 26 (see the arrows 40 and 42, respectively) making the frame 30 well-suited for a variety of installation locations (e.g., rack mounting, an electronic cabinet with front and rear doors, full or mini-tower configurations, etc.).

As further shown in FIG. 1, the processor subsystem 26 includes a set of storage processing circuits 44(1), . . . (collectively, storage processing circuits 44), a set of power supplies 46(1), . . . (collectively, power supplies 46), output elements 48 (only one shown in FIG. 1 for simplicity), and a support structure 50. Each storage processing circuit 44 is configured to individually perform data storage operations on the storage devices 24 while the data storage system 20 is in operation. The power supplies 46 are configured to provide power to the storage processing circuits 44 while the data storage system 20 is in operation. The output elements 48 provide status (normal mode, startup mode, etc.) to a user (e.g., a customer) while the data storage system 20 is in operation. The support structure 50 is configured to support the storage processing circuits 44, the power supplies 46 and the output elements 48. As will be explained in further detail shortly, the support structure 50 is configured to possess a carrying case form (e.g., a suitcase configuration) which enables the various components 44, 46, 48 of the processor subsystem 26 to concurrently connect to and disconnect from the interconnect 32 in a modularized, blind-actuating manner.

The input/output (I/O) device 28 (e.g., a keyboard, mouse and display assembly, a network interface that enables GUI remote access through a network browser, etc.) provides the user with control of the data storage system 20. In particular, the user is capable of monitoring and administering the operation of the data storage system 20 using a graphical user interface (GUI) 52 rendered on a display of the I/O device 28. The GUI 52 is configured to inform the user of the operating states of individual components of the data storage system 20. For example, if a particular storage device 24, power supply 46 or component of a storage processing circuit 44 were to fail, the GUI 52 identifies that particular component in a clear and simple manner to the user thus enabling the user to easily locate and attend to the failed component. Such operation is capable of occurring in combination with other troubleshooting schemes such as automated email notification and LED warning lights. In particular, as long as there is at least one non-failing storage processing circuit 44 which is capable of rendering the GUI 52, that non-failing storage processing circuit 44 is capable of signaling the user that (i) a component has failed (e.g., a storage device 24, a power supply 46, another storage processing circuit 44, etc.) and (ii) service is required to make the data storage system 20 fully operational again. An application which is well-suited for providing such a GUI 52 is Navisphere Express which is offered by EMC Corporation of Hopkinton, Mass.

Figure 2:
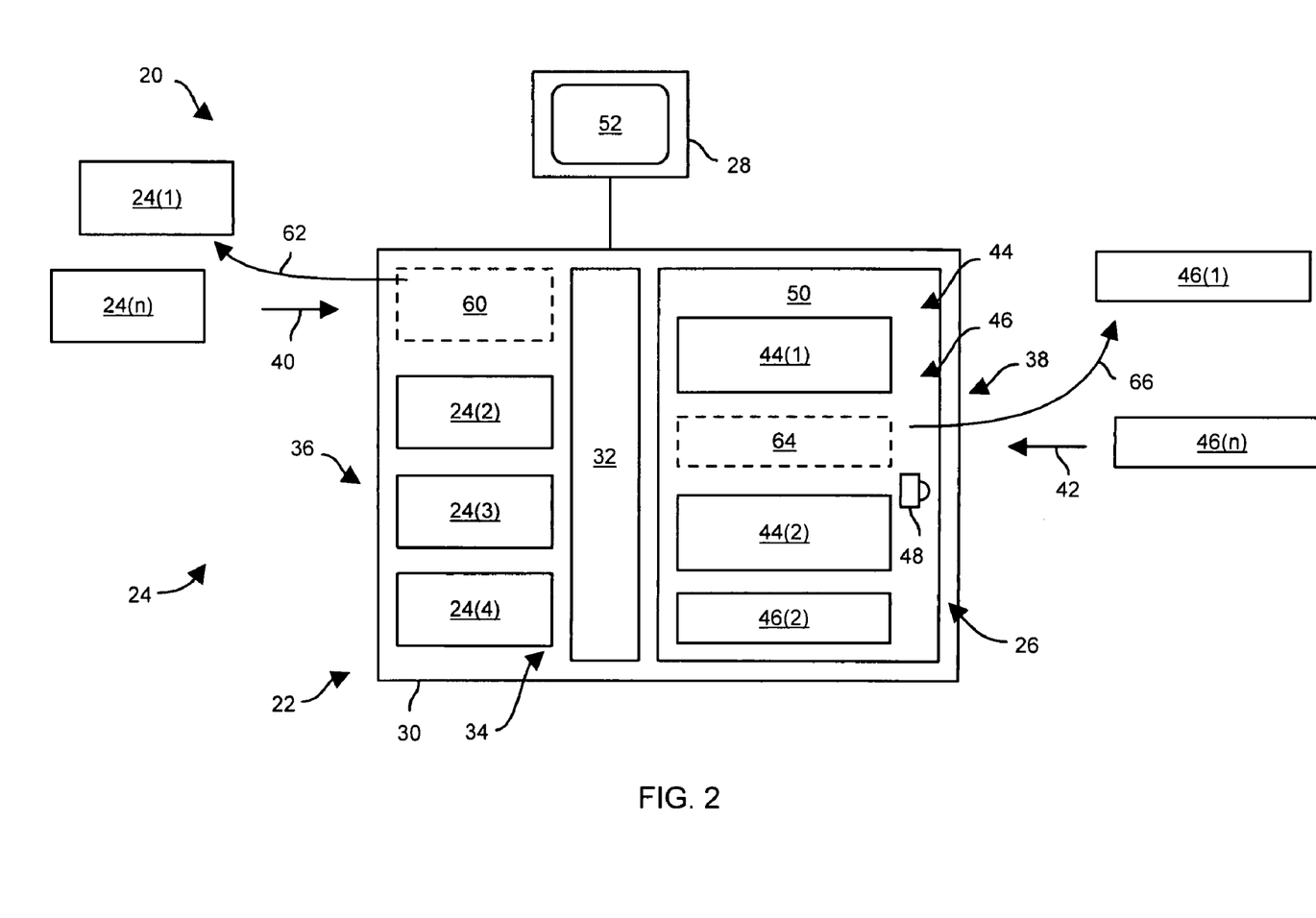
FIG. 2 shows a block diagram of the data storage system of FIG. 1 during hot replacement of particular components of the data storage system.
Figure 3:
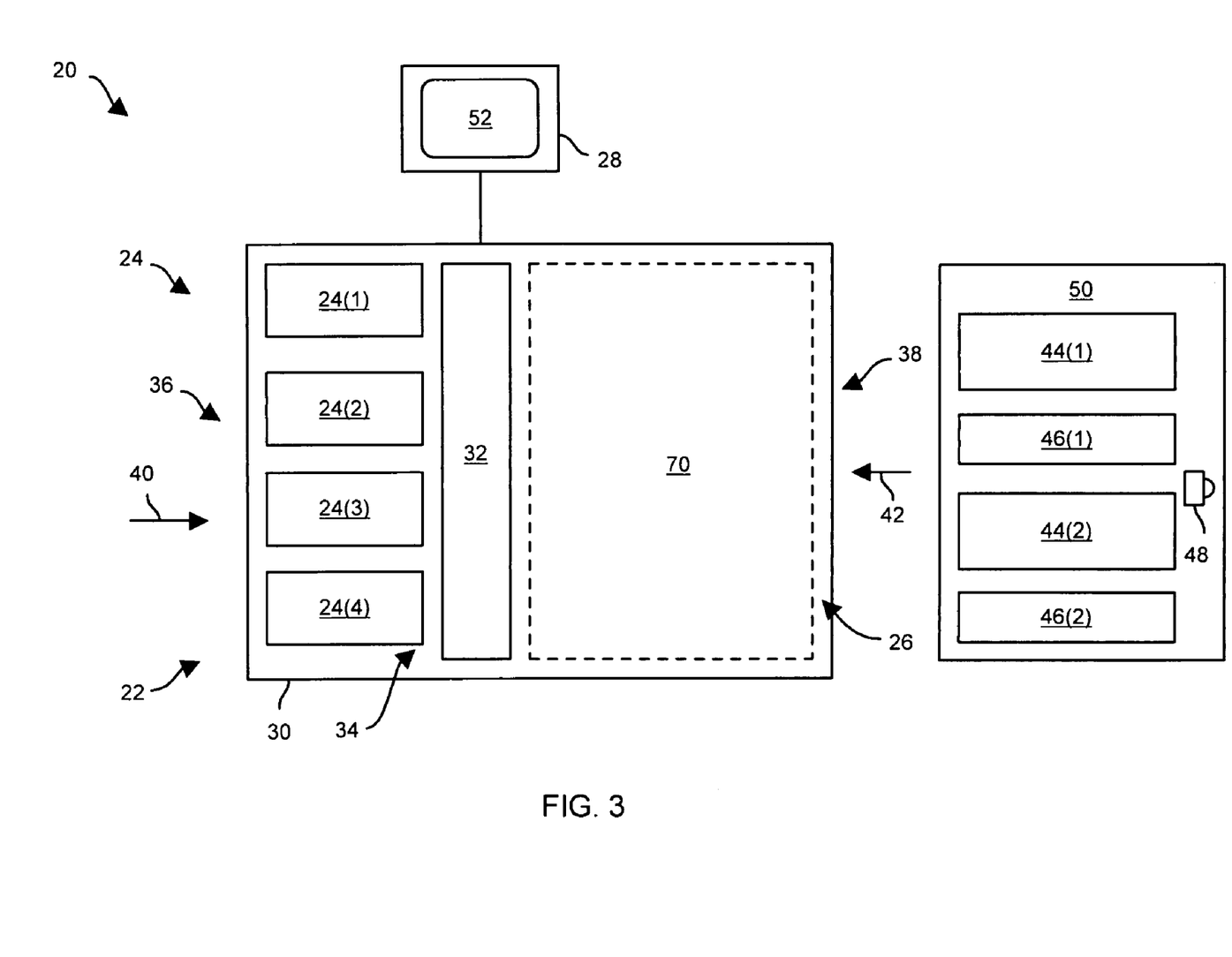
FIG. 3 shows a block diagram of the data storage system of FIG. 1 during servicing of a processing subsystem of the data storage system.

Further details of how the various components of the data storage system 20 are smartly partitioned for simple and effective servicing by a user will now be provided with reference to FIGS. 1 through 3. By way of example only, FIGS. 2 and 3 show the data storage system 20 as including four storage devices 24, two storage processing circuits 44, and two power supplies 46. It should be understood that other amounts of these components for different levels of flexibility and redundancy are suitable for use by different embodiments of the invention as well.

FIGS. 1 and 2 show that the interconnect 32 and the frame 30 are configured to receive each storage device 24 in a blind mating manner through the front opening 36. That is, when a user moves a storage device 24 in the direction 40 toward the interconnect 32 through the front opening 36 (see arrow 40), features along the sides of that storage device 24 engage complementary features along the frame 30 (e.g., rails or guide members) to properly align an interface of the storage device 24 (e.g., a storage device connector) with a corresponding interface of the interconnect 32 (e.g., an interconnect connector) to form a set of robust signal connections between the storage device 24 and the interconnect 32 without the user having to directly handle the interfaces. Securing mechanisms (e.g., latches, tabs, etc.) then lock the storage device 24 in place within the frame 30 to prevent the storage device 24 from inadvertently escaping (e.g., due to vibration).

To remove the storage device 24, the user must actuate a release mechanism (e.g., a button or lever) that unlocks the storage device 24 from the frame 30. The user is then able to pull the storage device 24 away from the interconnect 32 in a blind de-mating manner in a direction which is substantially opposite the arrow 40 (see direction of the arrow 42), i.e., the storage device 24 and the interconnect 32 disconnect from each other without the user having to directly manipulate their respective interfaces.

In particular, as shown in FIG. 2, removal of a faulty storage device 24 (e.g., the storage device 24(1)) and subsequent replacement of the faulty storage device 24 with a new storage device 24 (e.g., a new storage device 24(n)) is very straight forward. In certain arrangements, the user never needs to use any tools or equipment or physically touch any cables or connectors during the storage device mating or de-mating processes. Rather, the user simply operates a de-latching mechanism (e.g., a lever, a button, a tab, etc.) to disengage the faulty storage device 24 from the base 22 and removes the faulty storage device 24 from its installation location 60 (see the arrow 62 in FIG. 2), and then inserts the new storage device 24 into the same installation location 60 of the base 22 until the new storage device 24 secures into place (see the arrow 40 in FIG. 2).

Furthermore, such storage device replacement is capable of occurring in a hot-swapping manner. That is, the user does not need to power down the data storage system 20 when replacing the faulty storage device 24. Rather, the user can allow the data storage system 20 to remain in operation (i.e., remain available to perform data storage operations), during the storage device replacement process. When the data storage system 20 detects the new storage device 24 in place of the faulty storage device 24, the data storage system 20 is capable of performing a recovery operation to recover data which was lost on the faulty storage device 24 using standard data recovery techniques (e.g., error correction schemes based on parity information). Accordingly, the data storage system 20 provides high availability.

Similarly, as shown in FIGS. 1 and 2, the interconnect 32 and the frame 30 are configured to receive each power supply 46 in a blind mating manner through the rear opening 38. That is, when a user moves a power supply 46 in the direction 42 (i.e., the direction substantially opposite the direction 40) toward the interconnect 32 through the rear opening 38 (see arrow 42), features along the sides of that power supply 46 engage complementary features along the frame 30 (e.g., rails or guide members) to properly align an interface of the power supply 46 (e.g., a power supply connector) with a corresponding interface of the interconnect 32 (e.g., an interconnect connector) to form a set of robust signal connections between the power supply 46 and the interconnect 32 without the user having to directly handle the interfaces. Fastening mechanisms (e.g., latches, tabs, etc.) then lock the power supply 46 in place within the frame 30 to prevent the power supply 46 from inadvertently coming loose (e.g., due to vibration).

To remove the power supply 46, the user must actuate a release mechanism (e.g., a button or lever) that unlocks the power supply 46 from the frame 30. The user is then able to pull the power supply 46 away from the interconnect 32 in a blind de-mating manner in a direction which is substantially opposite the arrow 42 (see direction of the arrow 40). That is, the power supply 46 and the interconnect 32 disconnect from each other without the user having to directly manipulate their respective interfaces.

In particular, as shown in FIG. 2, removal of a faulty power supply 46 (e.g., the power supply 46(1)) and subsequent replacement of the faulty power supply 46 with a new power supply 46 (e.g., a new power supply 46(n)) is very straight forward. In certain arrangements, the user never needs to use any tools or equipment or physically touch any cables or connectors during the power supply mating or de-mating processes. Rather, the user simply operates a de-latching mechanism (e.g., a lever, a button, a tab, etc.) to disengage the faulty power supply 46 from the base 22 and removes the faulty power supply 46 from its installation location 64 (see the arrow 66 in FIG. 2), and then inserts the new power supply 46 into the same installation location 64 of the base 22 until the new power supply 46 secures into place (see the arrow 42 in FIG. 2).

Similar to the storage device replacement process, power supply replacement is capable of occurring in a hot-swapping manner. That is, the user does not need to power down the data storage system 20 when replacing the faulty power supply 46. Rather, the data storage system 20 is capable of running on power provided by one or more other power supplies 46 (e.g., see the second power supply 46(2) in FIG. 2) and the user can allow the data storage system 20 to remain in operation (i.e., remain available), during the power supply replacement process. When the data storage system 20 detects the new power supply 46 in place of the faulty power supply 46, the data storage system 20 is capable of transitioning back to a common power mode where all power supplies 46 share the power supplying burden of the data storage system 20 (e.g., current sharing). Further details of particular embodiments of the invention will now be provided with reference to FIG. 3.

FIG. 3 shows that the interconnect 32 and the frame 30 are further configured to receive the entire processing subsystem 26 in a blind mating manner through the rear opening 38. In particular, when the user moves the processing subsystem 26 in the direction 42 toward the interconnect 32 through the rear opening 38 (see the arrow 42), features along the sides of the processing subsystem 26 engage corresponding features along the frame 30 (e.g., rails or guide members) to properly align an interface of the processing subsystem 26 (e.g., an array of processing subsystem connectors) with a corresponding interface of the interconnect 32 (e.g., a set of interconnect connectors) to form a set of robust signal connections between the processing subsystem 26 and the interconnect 32 without the user having to directly manipulate the interfaces. In a manner similar to that for the storage devices 24 and for the power supplies 46, fastening mechanisms (e.g., latches, tabs, etc.) then lock the processing subsystem 26 in place within the frame 30 to prevent the processing subsystem 26 from inadvertently escaping (e.g., due to vibration).

To remove the processing subsystem 26, the user actuates a release mechanism (e.g., a button or lever) that unlocks the processing subsystem 26 from the frame 30. The user is then able to pull the entire processing subsystem 26 out of its installation location 70 and away from the interconnect 32 in a blind de-mating manner (the direction of the arrow 40). That is, the processing subsystem 26 and the interconnect 32 disconnect from each other requiring the user to directly manipulate their respective interfaces. After the user services the processing subsystem 26, the user simply returns the processing subsystem 26 back to its installation location 70 as explained above.

In some arrangements, the user never needs to use any tools or equipment or physically touch any cables or connectors during the processor subsystem installation or removal processes. Accordingly, servicing of the processor subsystem 26 is simple and straightforward and is capable of being performed by a customer thus enabling customer self-servicing and alleviating the need for the customer to incur the cost of a field service contract.

Since the processor subsystem 26 includes the power supplies 46, removal of the processor subsystem 26 involves powering down the data storage system 20. In particular, the user is capable of shutting down the data storage system 20 in a controller and reliable manner by operating the GUI 52 on the I/O device 28. Alternatively, the data storage system 20 includes a power button at the rear 38 of the base 22 that, when pressed by the user, shuts down the data storage system 20 (e.g., in a graceful manner similar to shutting down the data storage system 20 using the GUI 52). Accordingly, such a shutdown is capable of being scheduled during a convenient time such as during a planned maintenance period during off hours. Moreover, as will now be explained in further detail with reference to FIG. 4, the GUI 52 is capable of providing informative instructions to the user to minimize downtime and enable the user to replace only what is necessary.

Figure 4:
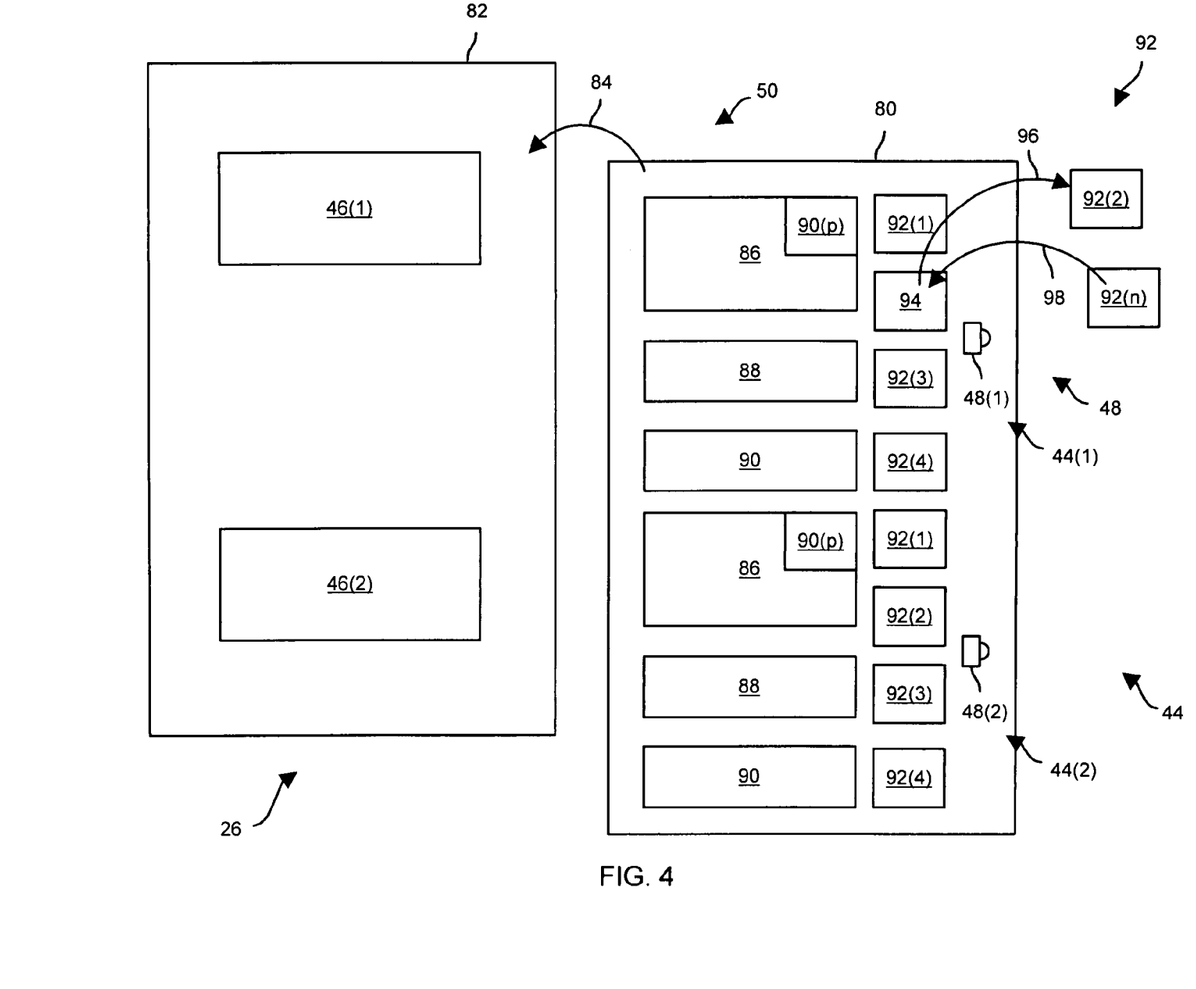
FIG. 4 is a block diagram of particular details of the processing subsystem of the data storage system of FIGS. 1 through 3.

FIG. 4 shows the processor subsystem 26 with the support structure 50 transitioned from a closed orientation to an open orientation after the user has extracted the processor subsystem 26 from the base 22 (also see FIG. 3). In particular, the user has slid the processor subsystem 26 out of its installation location 70, and placed the processor subsystem 26 on an easily accessible surface (e.g., a table top). To this end, recall that the support structure 50 has a carrying case or suitcase style form making it relatively easy for the user to maneuver from the installation location 70 to the easily accessible surface. Additionally, the user has separated a bottom portion 80 (e.g., a main chassis) of the support structure 50 from a top portion 82 (e.g., a cover) of the support structure 50 (see the arrow 84 in FIG. 4). By way of example only, the bottom portion 80 supports the storage processor circuits 44 and the top portion 82 supports the power supplies 46. After servicing is complete, the user simply puts the portions 80, 82 back into a closed orientation and returns the processing subsystem 26 into its installation location 70.

As shown in FIG. 4, each storage processor circuit 44 includes processing circuitry 86, primary memory 88, cache memory 90, and a set of fans 92. The processing circuitry 86 runs code from the primary memory 88 during operation (e.g., an operating system and a data storage application retrieved from a location on one or more of the storage devices 24). The cache memory 90 provides fast temporary storage of data exchanged between external hosts and the storage devices 24 (FIG. 1). The fans 92 provide cooling to the processing circuitry 86, the memory 88, 90 and the storage devices 24 during operation. In particular, for each storage processing circuit 44, a set of fans 92(1), 92(2), 92(3), 92(4) provides generally cooling, and a dedicated processor fan 92(p) provides specific cooling to the processing circuitry 86.

By way of example only, suppose that a component within one of the storage processing circuits 44 fails while the data storage system 20 is in operation. If there are multiple storage processing circuits 44, as long as there is at least one non-failing storage processing circuit 44 (e.g., the storage processing circuit 44(2) in FIG. 4), the data storage system 20 as a whole is capable of continuing operation in a high availability manner. In particular, a non-failing storage processing circuit 44 signals the user that a component has failed and that service is required to make the data storage system 20 fully operational again.

Specifically, the non-failing storage processing circuit 44 renders the GUI 52 (FIG. 1) enabling the user to ascertain which component has failed. If the failure resides in a storage device 24 or a power supply 46, the user is capable of replacing that component in a hot-swapping manner while the data storage system 20 remains available. On the other hand, if the failure resides in a storage processing circuit component, the user is then able to shutdown the data storage system 20 at a convenient time (e.g., late at night, early in the morning, on a weekend, during regularly scheduled downtime, etc.), remove the support structure 50, and access the failed component as shown in FIG. 4.

By way of a specific example, suppose that the fan 92(2) of the storage processing circuit 44(1) fails. The GUI 52 then notifies the user. When the user subsequently shuts down the data storage system 20 and removes the processor subsystem 26, the user is capable of identifying the fan 92(2) by labels distinguishing the storage processing circuits 44 from each other and other labels distinguishing the fans 92 from each other, among other things. The user is then able to remove the failed component, i.e., the fan 92(2), from the storage processing circuit 44(1) (see the arrow 96) and substitute a new component in place of the failed component, i.e., a new fan 92(n) in place of the failed fan 92(2) if the storage processing circuit 44(1) (see the arrow 98). The user then closes the support structure 50 by recombining the portions 80, 82 of the support structure 50 and inserts the processing subsystem 26 back into its installation location 70 (FIG. 2). In some arrangements, the user never needs to use any tools or equipment or physically touch any cables or connectors throughout the entire replacement process. As a result, servicing is extremely easy and is capable of being performed by a novice thus making a field service contract and its associated costs unnecessary. Further details of the invention will now be provided with reference to FIG. 5.

Figure 5:
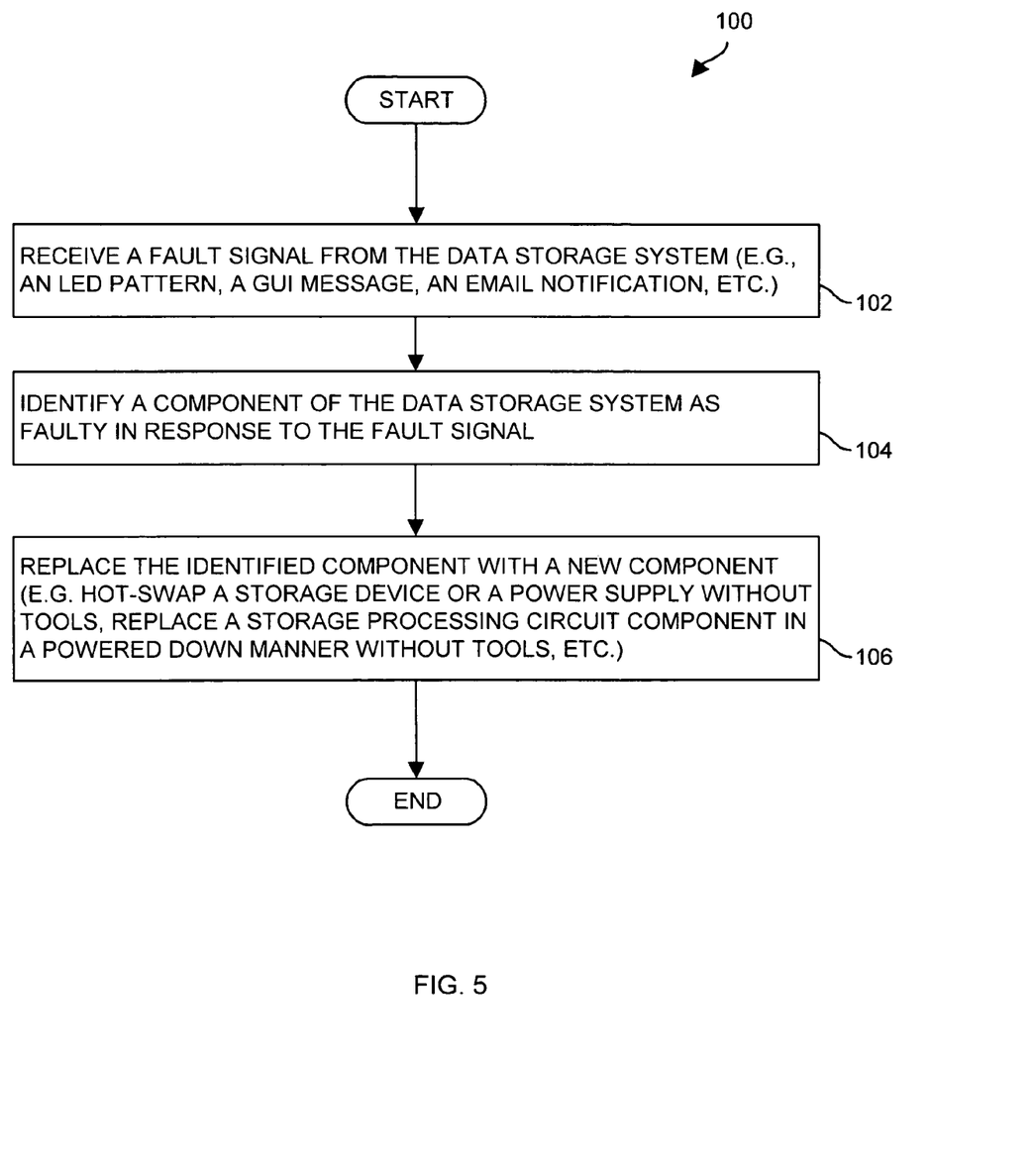
FIG. 5 is a flowchart of a procedure which is performed by a user when servicing the data storage system of FIGS. 1 though 3.

FIG. 5 is a flowchart of a procedure 100 which is performed by a user when servicing the data storage system 20. In step 102, the user receives a fault signal from the data storage system 20. Recall that there are a variety of signaling mechanisms which are available to the user to provide the fault signal. For example, the output elements 48 of the processing subsystem 26 (FIG. 1) are capable of notifying the user that the data storage system 20 is fully operational or alternatively that a component has failed (e.g., a set of LEDs providing different flashing patterns or remaining steadily lit). As another example, a non-failing storage processing circuit 44 is capable of rendering the GUI 52 to visually illustrate the status of the data storage system 20 to the user (e.g., the user is capable of navigating through a hierarchical troubleshooting tree to identify and locate a component failure). As yet another example, the non-failing storage processing circuit 44 is capable of sending a message (e.g., an email notification) of the status of the data storage system 20.

In step 104, the user identifies a component of the data storage system 20 as faulty in response to receiving the fault signal. At this point, the user may have a replacement component readily handy. Otherwise, the user may need to order a replacement component. Nevertheless, the data storage system 20 is capable of remaining operational as whole since it is configured for high availability.

In step 106, the user replaces the identified component with a new component. In particular, the user replaces the identified component in a hot-swapping manner if the failed component is a storage device 24 or a power supply 46. Furthermore, the user replaces the identified component in a powered-down manner when the identified component is a portion of a storage processing circuit 44 (also see FIG. 4). As mentioned earlier, such replacement is easily performed by a customer and does not require the use of tools or extensive training.

It should be understood that the smart partitioning of the various components enables the user to minimize replacement costs. For example, suppose that the processing circuitry 86 of a storage processing circuit 44 fails. In this situation, the user may be able to obtain a new processor subsystem 26 but without many of the modularized components since such components are capable of being reused from the original processor subsystem 26. In particular, components such as the power supplies 46, the fans 92 and perhaps even the memory circuits 88, 90 are capable of being easily removed without tools from the original processor subsystem 26 and installed into corresponding locations in the replacement processor subsystem 26 to save costs.

Furthermore, it should be understood that the user is capable of performing certain troubleshooting steps which do not involve part replacement. For example, the various signaling mechanisms described above also enable the user to isolate potentially problematic parts and attempt simple correction techniques (e.g., re-seating a component).

For instance, the output elements 48 (e.g., a respective LED for each storage processing circuit 44) provides signals to the user to inform the user whether a particular problem exists during a startup process. In particular, the output element 48 flashes at a first rate (e.g., a slow rate) when the processing circuitry 86 of its storage processing circuit 44 runs a startup self-test. Next, if the processing circuitry 86 successfully completes the self-test, the output element 48 flashes at a second rate (e.g., a faster rate) when the processing circuitry 86 of its storage processing circuit 44 runs a booting sequence (e.g., runs initialization firmware or a BIOS). Then, if the processing circuitry 86 successfully completes the boot sequence, the output element 48 flashes at a third rate (e.g., a very fast rate) when the processing circuitry 86 of its storage processing circuit 44 loads the operating system. Finally, if the processing circuitry 86 successfully loads the operating system and enters a normal operating mode, the output element 48 provides a fourth output (i.e., a steady blank output where the LED remains unlit or OFF). Cycling through the outputs in a serial order as described above enables the user to identify the current operation of the storage processing circuits 44 during startup when the GUI 52 is not yet available. Accordingly, the user is capable of performing certain troubleshooting steps simply by watching the output element 48 (e.g., the user can determine where the data storage system 20 is failing an obtain an appropriate replacement part). For instance, if there is a failure of a component, the output element 48 transitions from the fourth output to a fifth output (e.g., a steady ON where the LED remains lit) to indicate that a fault has occurred.

As mentioned above, embodiments of the invention are directed to techniques for servicing a data storage system 20 which are generally simple and easy to perform even by an untrained person (e.g., a novice). Such techniques rely on smart partitioning of various data storage system components (e.g., storage devices 24, power supplies 46, storage processing circuits 44) which enables the data storage system 20 to provide high availability features but nevertheless be affordable and serviceable by the untrained person thus allowing for timely and effective self-servicing and alleviating the need for an expensive field service contract.

While this invention has been particularly shown and described with references to preferred embodiments thereof, it will be understood by those skilled in the art that various changes in form and details may be made therein without departing from the spirit and scope of the invention as defined by the appended claims.

For example, replacement of the fan 92(2) was described above as requiring opening and closing of the portions 80, 82 by way of example only. In other arrangements, the user is not required to open the portions 80, 82 (i.e., to remove the cover 80 of the suitcase) in order to gain access. In one arrangement, the user does not need to remove the cover portion 80 to replace the fans 92(1), 92(2), 92(3) and 92(4), but only needs to remove the cover portion 80 to replace other components (e.g., the memories 88, 90 or the fan 92(p)).

What is claimed is:

1. A data storage system, comprising:

a base having a frame and an interconnect disposed within the frame, the frame defining a front opening and a back opening;

storage devices configured to couple with the interconnect in a blind mating manner when the storage devices are moved in a first direction toward the interconnect through the front opening defined by the frame; and a processing subsystem configured to couple with the interconnect a blind mating manner when the processing subsystem is moved in a second direction toward the interconnect through the back opening defined by the frame, the first and second directions being substantially opposite to each other, the processing subsystem being configured to electronically communicate with the storage devices through the interconnect;

wherein all of the storage devices are located exclusively on a first side of the interconnect, and the processing subsystem is located exclusively on a second side of the interconnect, the first and second sides being substantially opposite each other;

wherein the processing subsystem includes:

a set of storage processing circuits, each storage processing circuit being configured to individually perform data storage operations on the storage devices while the data storage system is in operation;

a set of power supplies configured to provide power to the set of storage processing circuits while the data storage system is in operation;

a support structure configured to support the set of storage processing circuits and the set of power supplies when the processing subsystem connects with the interconnect of the base, each power supply being configured to (i) install into the support structure in a blind mating manner when that power supply moves in the second direction and (ii) de-install from the support structure in a hot-swappable manner while the data storage system is in operation when that power supply moves in the first direction; and an output element that provides (i) a first output when the processing subsystem fails to pass a startup self-test, (ii) a second output when the processing subsystem passes the startup self-test fails but fails to complete a booting sequence, (iii) third output when the processing subsystem completes the booting sequence but fails to complete an operating system loading procedure, and (iv) a fourth output when the processing subsystem completes the operating system loading procedure, the output element providing the first, second, third and fourth outputs in serial order when the processing subsystem respectively transitions from a powered-down state to a normal operating state, through the startup self-test, the booting sequence, and the operating loading procedure;

wherein the output element is a light emitting diode, wherein the first output is flashing of the light emitting diode at a first rate, wherein the second output is flashing of the light emitting diode at a second rate which is faster than the first rate, wherein the third output is flashing of the light emitting diode at a third rate which is faster than the second rate, and wherein the fourth output is the light emitting diode remaining in a steady unlit state.

2. The data storage system of claim 1 wherein the support structure forms a carrying case that enables a user to concurrently install the set of storage processing circuits and the power supplies within the base when the user slides the carrying case toward the interconnect through the back opening defined by the frame, and concurrently remove the set of storage processing circuits and the power supplies from the base when the user slides the carrying case away from the interconnect through the back opening defined by the frame.

3. The data storage system of claim 2 wherein each storage processing circuit includes processing circuitry, primary memory, a set of fans and cache memory; and wherein the carrying case is configured (i) simultaneously contain the processing circuitry, primary memory, a set of fans and cache memory when the carrying case is removed from the based structure and when the carrying case is in a closed position, and (ii) enable individual replacement of any of the processing circuitry, the primary memory, the set of fans and the cache memory in a modularized manner when the carrying case is removed from the base and when the carrying case is in an opened position.

4. The data storage system of claim 3, further comprising: an input/output assembly coupled to the storage processing subsystem, the storage processing subsystem being configured to (i) detect a fault among the processing circuitry, the primary memory, the set of fans and the cache memory of each storage processing circuit, and (ii) identify that fault to a user through the input/output assembly.

5. The data storage system of claim 4 wherein the input/output assembly is configured to provide a graphical user interface which enable the user to locate the fault within the data storage system.

6. The data storage system of claim 1 wherein each storage device is configured to de-couple from the interconnect in a hot-swappable manner while the data storage system is in operation when that storage device moves in the second direction.

7. A processing subsystem for a data storage system, the processing subsystem comprising:
   a set of storage processing circuits, each storage processing circuit being configured to individually perform data storage operations on the storage devices while the data storage system is in operation;
   a set of power supplies configured to provide power to the set of storage processing circuits while the data storage system is in operation; and
   a support structure configured to support the set of storage processing circuits and the set of power supplies when the processing subsystem connects with an interconnect of the data storage system, each power supply being configured to (i) install into the support structure in a blind mating manner and (ii) de-install from the support structure in a hot-swappable manner while the data storage system is in operation;
   wherein the processing subsystem further includes an output element that provides (i) a first output when the processing subsystem fails to pass a startup self-test, (ii) a second output when the processing subsystem passes the startup self-test fails but fails to complete a booting sequence, (iii) third output when the processing subsystem completes the booting sequence but fails to complete an operating system loading procedure, and (iv) a fourth output when the processing subsystem completes the operating system loading procedure, the output element providing the first, second, third and fourth outputs in serial order when the processing subsystem respectively transitions from a powered-down state to a normal operating state, through the startup self-test, the booting sequence, and the operating loading procedure;
   wherein the output element is a light emitting diode, wherein the first output is flashing of the light emitting diode at a first rate, wherein the second output is flashing of the light emitting diode at a second rate which is faster than the first rate, wherein the third output is flashing of the light emitting diode at a third rate which is faster than the second rate, and wherein the fourth output is a constant lighting of the light emitting diode.

8. The processing subsystem of claim 7 wherein the support structure forms a carrying case that enables a user to concurrently install the set of storage processing circuits and the power supplies within a base of the data storage system when the user slides the carrying case toward the interconnect through an opening defined by a frame of the base of the data storage system, and concurrently remove the set of storage processing circuits and the power supplies from the data storage system when the user slides the carrying case away from the interconnect through the opening defined by the frame of the base of the data storage system.

9. The processing subsystem of claim 8 wherein each storage processing circuit includes processing circuitry, primary memory, a set of fans and cache memory; and wherein the carrying case is configured (i) simultaneously contain the processing circuitry, primary memory, a set of fans and cache memory when the carrying case is removed from the base of the data storage system and when the carrying case is in a closed position, and (ii) enable individual replacement of any of the processing circuitry, the primary memory, the set of fans and the cache memory in a modularized manner when the carrying case is removed from the base of the data storage system and when the carrying case is in an opened position.

10. A method for servicing a data storage system, the method comprising:
   receiving a fault signal from the data storage system, the data storage system having an interconnect, storage devices coupled to a first side of the interconnect, and a processing subsystem coupled to a second side of the interconnect that is substantially opposite the first side;
   identifying a component of the data storage system as faulty in response to receiving the fault signal; and
   replacing the identified component with a new component, the identified component being replaced in a hot-swapping manner when the identified component is a storage device, the identified component being replaced in a hot-swapping manner when the identified component is a power supply, and the identified component being replaced in a powered-down manner when the identified component is a portion of a storage processing circuit;
   wherein all of the storage devices are located exclusively on a first side of the interconnect, and the processing subsystem is located exclusively on a second side of the interconnect, the first and second sides being substantially opposite each other;
   wherein receiving a fault signal includes receiving a fault signal from a series of flashing lights, the flashing lights provided by a light emitting diode, wherein a first output is flashing of the light emitting diode at a first rate, wherein a second output is flashing of the light emitting diode at a second rate which is faster than the first rate, wherein a third output is flashing of the light emitting diode at a third rate which is faster than the second rate, and wherein a fourth output is a constant lighting of the light emitting diode.

11. The method of claim 10 wherein the storage device belongs to a set of storage devices, wherein the power supply belongs to a set of power supplies, wherein the storage processing circuit belongs to a set of storage processing circuits, wherein the identified component is the portion of the storage processing circuit, and wherein replacing includes:
   powering down the data storage system;
   sliding a carrying case away from a base of the data storage system to disconnect the carrying case from the base, the base of the data storage system supporting the set of storage devices, the carrying case holding the set of storage processing circuits and the set of power supplies;
   substituting the portion of the storage processing circuit with a new portion; and sliding the carrying case toward the base of the data storage system to re-connect the carrying case to the base.

12. The method of claim 11 wherein the portion of the storage processing circuit is a faulty fan, and wherein substituting includes:
   taking a cover off the carrying case;
   removing the faulty fan;
   positioning a new fan in place of the faulty fan; and
   putting the cover back on the carrying case.

13. The method of claim 12 wherein identifying includes:
   ascertaining which of multiple fans is the faulty fan by reading a graphical user interface.

14. The method of claim 11 wherein the portion of the storage processing circuit is a faulty memory circuit, and wherein substituting includes:
   taking a cover off the carrying case;
   removing the faulty memory circuit;
   positioning a new memory circuit in place of the faulty memory circuit; and
   putting the cover back on the carrying case.

15. The method of claim 14 wherein identifying includes:
   ascertaining which of multiple memory circuits is the faulty memory circuit by reading a graphical user interface.

16. The method of claim 11 wherein the portion of the storage processing circuit is faulty processing circuitry, and wherein substituting includes:
   removing the set of power supplies from the carrying case, the carry case holding the faulty processing circuitry;
   replacing the carrying case holding the faulty processing circuitry with a new carrying case having new processing circuitry; and
   installing the removed set of power supplies into the new carrying case.

17. The method of claim 10 wherein the storage device belongs to a set of storage devices, wherein the power supply belongs to a set of power supplies, wherein the storage processing circuit belongs to a set of storage processing circuits, wherein the identified component is the power supply, and wherein replacing includes:
   while the data storage system remains in operation, removing the power supply from a carrying case of the data storage system to disconnect the power supply from the data storage system, the carrying case holding the set of storage processing circuits and being configured to disconnect from and re-connect with a base of the data storage system in a blind mating manner, the base supporting the set of storage devices; and
   installing a new power supply into the carrying case in place of the removed power supply.

18. The data storage system of claim 1 wherein the storage devices include disk-based storage which provides non-volatile storage in support of main memory.

19. The method for servicing a data storage system of claim 10 wherein the storage devices include disk-based storage which provides non-volatile storage in support of main memory.

* * * * *